Nov. 26, 1946.  W. L. DE BAUFRE  2,411,711
METHOD AND APPARATUS FOR SEPARATING AND LIQUEFYING GASES
Filed Sept. 22, 1941  2 Sheets-Sheet 2

William Lane De Baufre
INVENTOR

Patented Nov. 26, 1946

2,411,711

UNITED STATES PATENT OFFICE 2,411,711

METHOD AND APPARATUS FOR SEPARATING AND LIQUEFYING GASES

William Lane De Baufre, Lincoln, Nebr.

Application September 22, 1941, Serial No. 411,874

17 Claims. (Cl. 62—175.5)

This invention relates to improvements in the art of separating mixed gases by liquefaction and rectification, being particularly useful in the separation of one of the constituents in liquid form. It is, for example, particularly useful in the production of liquid oxygen by the liquefaction and rectification of atmospheric air.

The primary object of the invention is to increase the amount of refrigeration produced in the process in order to compensate for the refrigeration lost in removing the oxygen in liquid form. In gaseous oxygen plants, the refrigeration in the liquid oxygen produced is recovered by vaporizing the liquid oxygen and heating the resulting vapor to approximately atmospheric temperature.

Another object of the invention is to produce this refrigeration with minimum power expenditure by reducing the compression pressure of the air to be separated. In order to accomplish this purpose, an auxiliary cycle is provided to augment the refrigeration produced in the main cycle of the air to be separated.

A further object of the invention is to tie in this auxiliary refrigeration cycle with the main separation cycle so as to eliminate any need of purification of the refrigerant except as it may be contaminated in passing through the refrigeration cycle.

A further object of the invention is to tie in the main and refrigeration cycles together so as to simplify the construction of the apparatus and insure automatic operation.

A further object of the invention is to increase the purity and recovery of the products by increasing the vapor and liquid refluxes in rectification. This step would be advantageous in separating the products in gaseous form; but it is particularly valuable in separating one of the products in liquid form because these refluxes are reduced by withdrawing one product in liquid form.

Figure 1:
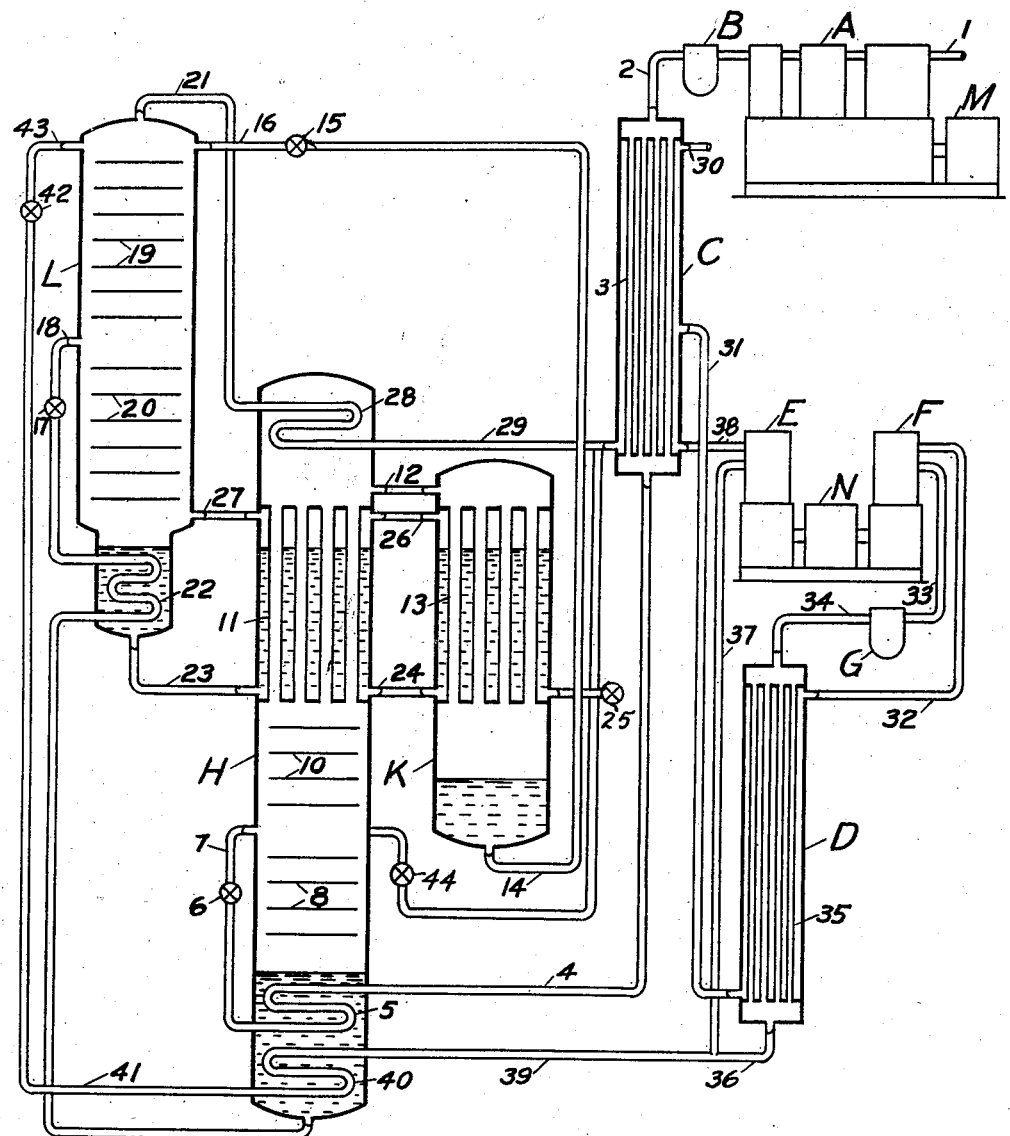
Figure 2:
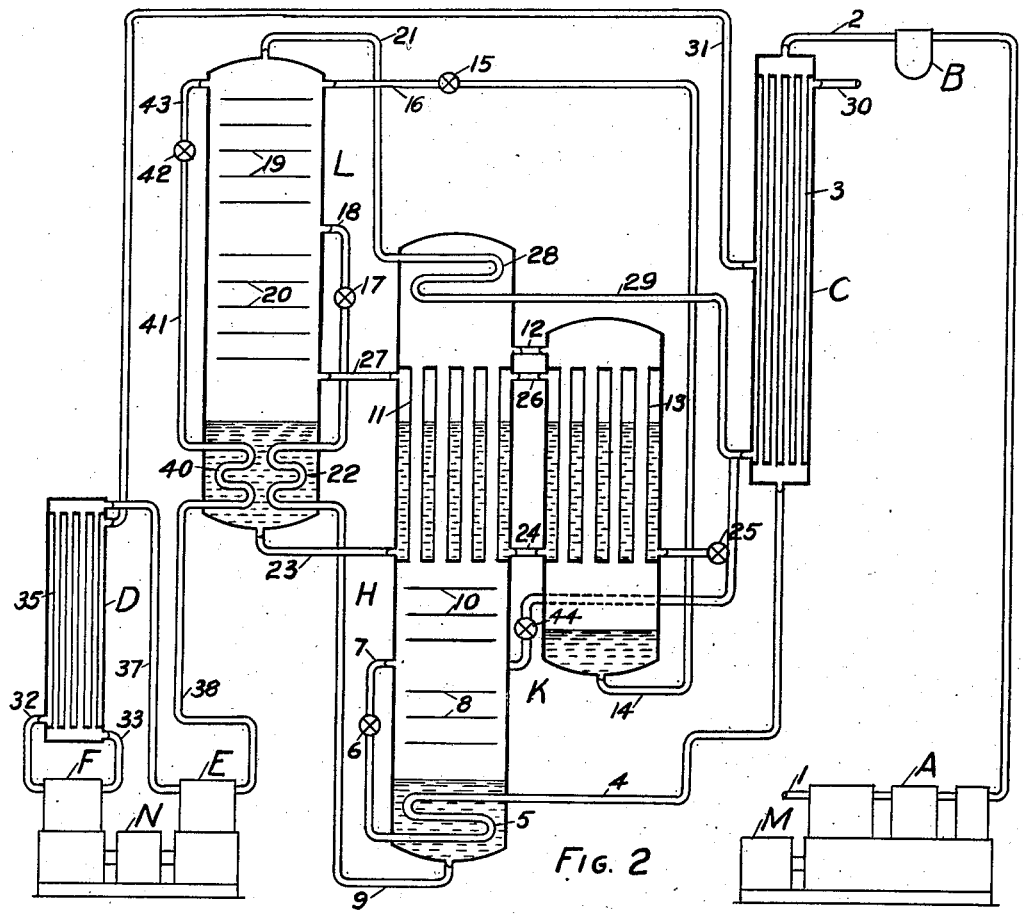
Figure 3:
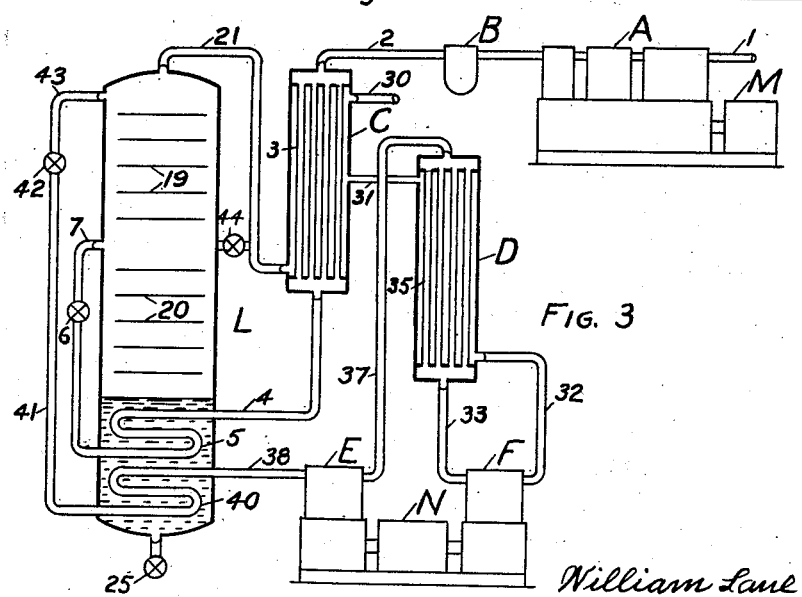

The foregoing, together with such other advantages as may hereinafter appear or are incident to the invention, are realized by the construction illustrated in preferred form in the accompanying drawings wherein: Figure 1 shows one arrangement of a two-stage rectification liquid oxygen plant. Figure 2 shows an alternative arrangement of a two-stage rectification plant. Figure 3 shows one arrangement of a single-stage rectification plant.

Referring to the drawings, a plant for producing liquid oxygen from atmospheric air might include:

Three-stage compressor A with intercoolers and aftercooler for compressing atmospheric air to be processed and removing the heat of compression. This compressor is driven by motor M.

Purification apparatus B for removing moisture and carbon dioxide from the compressed air.

Interchanger C for cooling the compressed air by the returning nitrogen product of rectification.

Auxiliary interchanger D for warming a portion of the nitrogen product of rectification in cooling this portion after compression by compressor F.

Expansion engine E for expanding part or all of the recooled compressed nitrogen. Expansion engine E and compressor F are both connected to motor N. Purifier G may also be provided for the compressed nitrogen.

Preliminary rectifier H for separating the cooled air into a vapor portion of nearly pure nitrogen and a liquid portion rich in oxygen.

Exchanger K for liquefying the vapor portion.

Final rectifier L for separating the two liquefied portions from preliminary rectifier H and exchanger K into nearly pure nitrogen and nearly pure oxygen.

In Figure 3, single-stage rectifier L is employed, preliminary rectifier H and exchanger K being omitted. Purifier G is not shown in Figure 2 and Figure 3.

The above listed apparatus can be used for separating in liquid form one component of any gaseous mixture. The apparatus will be described, however, for the production of liquid oxygen from atmospheric air. The following description was written for Figure 1, but will apply to Figure 2 and Figure 3 except for details mentioned later.

The atmospheric air to be processed enters compressor A through pipe 1. Purifiers for removal of carbon dioxide might be provided for the air before it flows through pipe 1. In the drawings, however, removal of carbon dioxide is combined with drying in purifier B through which the air flows after being compressed by compressor A. The pressure of compression will vary with conditions and may be selected in accordance with the economics of any particular case. Assume a high pressure of 50 atmospheres for a small liquid oxygen plant.

Compressor A is provided with intercoolers and an aftercooler to remove the heat of compression. The purified compressed air at about atmospheric temperature enters the upper head of interchanger C through pipe 2. Within interchanger C, the purified compressed air is cooled to a low temperature while flowing down through tubes 3. From the lower head of interchanger C, the cooled compressed air leaves through pipe 4.

The cooled compressed air flows through coil 5 where it is further cooled by vaporizing some of the liquid surrounding this coil. The pressure is then reduced by throttle valve 6 so that the air to be processed enters preliminary rectifier H through pipe 7 under a pressure of say 4 atmospheres. Under this reduced pressure, the air is part liquid and part vapor.

The liquid part flows down over trays 8 and accumulates around the coils in the bottom of preliminary rectifier H. By heat transfer from the fluids within these coils, this liquid is vaporized to form a vapor reflux for the preliminary rectification. The liquid remaining unvaporized leaves through pipe 9.

The vapor reflux mentioned together with the vapor entering through pipe 7, rise through trays 10. Within tubes 11, the rising vapor is condensed to form a liquid reflux for the preliminary rectification. The vapor remaining flows through pipe 12 to exchanger K.

By the rectifying action of liquid and vapor refluxes upon trays 8 and 10, the entering atmospheric air is separated into a nearly pure nitrogen vapor leaving preliminary rectifier H through pipe 12 and an oxygen-rich liquid leaving through pipe 9.

The nearly pure nitrogen vapor is condensed within tubes 13 of exchanger K. The resulting nearly pure nitrogen liquid leaves exchanger K through pipe 14. This liquid is throttled through valve 15 and enters final rectifier L through pipe 16. In final rectifier L, the nearly pure nitrogen liquid serves as a reflux liquid to rectify the oxygen-rich liquid from preliminary rectifier H. This oxygen-rich liquid is throttled through valve 17 and enters final rectifier L through pipe 18.

The final rectification occurs on trays 19 above the inlet and trays 20 below the inlet of final rectifier L, resulting in nearly pure nitrogen vapor leaving the final rectifier through pipe 21 and nearly pure oxygen liquid accumulating in the pot at the bottom of the final rectifier.

A portion of the nearly pure oxygen liquid is vaporized by heat transfer from the oxygen-rich liquid flowing through coil 22 before being throttled through valve 17. The remaining nearly pure oxygen liquid flows through pipe 23 to preliminary rectifier H where more of it is vaporized by heat transfer through tubes 11 in producing liquid reflux for the preliminary rectification. The remainder of the nearly pure oxygen liquid flows through pipe 24 to exchanger K where more of it is vaporized in condensing the vapor product of the preliminary rectification. The nearly pure oxygen liquid remaining is withdrawn as the liquid oxygen product of the process through valve 25.

The vapor produced in exchanger K leaves through pipe 26. The commingled vapor from exchanger K and preliminary rectifier H flows through pipe 27 to final rectifier L where it forms the vapor reflux for the final rectification. The vapor reflux for the final rectification is augmented by cooling the liquid product of the preliminary rectification as this liquid flows through coil 22.

The vapor product of the final rectification flows through coil 28 in the top of preliminary rectifier H. In so doing, heat is transferred from the vapor product of the preliminary rectification to the vapor product of the final rectification. Some of the former is condensed, thereby augmenting the liquid reflux in the preliminary rectification.

The slightly warmed nitrogen vapor product of the final rectification flows through pipe 29 to the shell of interchanger C. In flowing up through the shell of interchanger C, the nitrogen is warmed nearly to atmospheric temperature in cooling the compressed air flowing down through tubes 3. The nitrogen gas finally leaves at nearly atmospheric temperature through pipe 30 as one product of the process.

A portion of the returning nitrogen is withdrawn from interchanger C at an intermediate point through pipe 31 and flows through the shell of auxiliary interchanger D where this portion of nitrogen is warmed approximately to atmospheric temperature. The flow of nitrogen is induced by compressor F driven by motor N, pipe 32 conveying the returning nitrogen from auxiliary interchanger D to compressor F. The nitrogen is compressed by compressor F and then discharged through pipe 33 to purifier G where it is purified of any oil vapor, etc., contaminating it. The purified compressed nitrogen flows through pipe 34 to the head of auxiliary interchanger D.

In flowing through tubes 35 within auxiliary interchanger D, the compressed nitrogen is cooled by heat transfer to the returning cold nitrogen from interchanger C. Leaving auxiliary interchanger D through pipe 36, the cooled compressed nitrogen is divided into two parts. One part flows through pipe 37 to expansion engine E where it is expanded by doing work. This removes heat from the nitrogen, thereby cooling as well as expanding it. The cold expanded nitrogen is discharged through pipe 38 into the shell of interchanger C where it commingles with the returning nitrogen therein. In this way, the cooling effect of the returning nitrogen is augmented and the compressed air is cooled to a lower temperature within tubes 3.

The other part of the cooled compressed nitrogen flows through pipe 39 to coil 40 within preliminary rectifier H. Heat transfer occurs from this compressed nitrogen to the oxygen-rich liquid within preliminary rectifier H thereby vaporizing some of the oxygen-rich liquid and augmenting the vapor reflux in the preliminary rectification. From coil 40, the further cooled compressed nitrogen flows through pipe 41 to throttle valve 42 where the pressure is reduced. The nitrogen is then discharged into final rectifier L through pipe 43, most of the nitrogen being in liquid form as the result of cooling it in coil 40. This liquid nitrogen augments the liquid reflux in the final rectification. The nitrogen vapor leaving through pipe 21 is increased by the amount of nitrogen admitted through pipe 43 thereby further augmenting the cooling effect of the returning nitrogen in interchanger C.

The result of augmenting the liquid reflux in the final rectification and the vapor reflux in the preliminary rectification by means of nitrogen from the auxiliary refrigeration cycle as described, is to also augment the vapor reflux in the final rectification and the liquid reflux in the preliminary rectification. This is due to the thermal relations involved in a two-stage rectification process where the liquid reflux for the preliminary rectification is produced by heat transfer in vaporizing liquid to form the vapor reflux in the final rectification. The augmenting of all refluxes in both preliminary and final rectifications results in a more nearly complete separation of atmospheric air into its main constituents oxygen and nitrogen with any given type and proportions of the preliminary and final rectifiers. In fact, sufficient refluxes are thereby obtained to produce a degree of separation which would otherwise be impossible to attain with any type and proportions of rectifiers because the necessary thermal relations would not be present.

The attainment of these added refluxes and improved thermal relations by the use of a portion of the vapor product of the final rectification is particularly advantageous because this portion can be commingled with the liquid reflux in the final rectification without contaminating the reflux or the product of rectification. The same result could be obtained, however, by another fluid, such as a portion of the original gaseous mixture if provision were made to avoid such contamination.

The apparatus in Figure 2 differs from the apparatus in Figure 1 in that the cooled compressed portion of nitrogen leaving auxiliary interchanger D is all expanded by expansion engine E and is then all used for creating refluxes in the rectification of the atmospheric air. These two steps in the process are thus in series instead of in parallel. A further difference is that the refluxes are augmented in the final rectification only rather than in both preliminary and the final rectifications.

Referring to Figure 2, the cooled compressed portion of nitrogen flows from auxiliary interchanger D through pipe 37 to expansion engine E where it is all expanded and cooled. The expanded portion of nitrogen then flows through pipe 38 to coil 40 immersed in the liquid in the bottom of final rectifier L. Part of this liquid is vaporized to augment the vapor reflux in the final rectification, the nitrogen portion being further cooled and partly liquefied within coil 40. The partly liquefied nitrogen flows through pipe 41 to throttle valve 42 and is then discharged through pipe 43 into final liquefier L.

It is necessary to maintain a sufficiently high pressure within coil 40 by means of throttle valve 42 in order to partly liquefy the nitrogen at the temperature in the bottom of final rectifier L. Coil 40 might be located in the bottom of preliminary rectifier H as shown in Figure 1 with the arrangement otherwise as shown in Figure 2. A higher pressure would have to be maintained in coil 40, however, in order to liquefy the nitrogen at the higher temperature within the preliminary rectifier. The increased back pressure on expansion engine E would decrease the refrigerating effect obtained by adiabatic expansion. The arrangement in Figure 2 thus provides larger refrigerating effect with less reflux effect than if coil 40 were in the preliminary rectifier.

The apparatus in Figure 3 differs from the apparatus in Figure 2 in that single-stage rectification is used instead of two-stage rectification. The cooled compressed portion of nitrogen leaving auxiliary interchanger D through pipe 37 is all expanded in expansion engine E and is then all used to produce refluxes in the single-stage rectification by flowing through coil 40, being throttled through valve 42 and then being injected into the top of rectifier L.

With a three-stage compressor A, the pressure of compression may be sufficiently high to cool the apparatus to operating temperatures by throttling the compressed air to nearly atmospheric pressure at valve 6. In this case, there will be an appreciable drop in temperature by throttling. The cooled gas will cool the preliminary rectifier H and final rectifier L in flowing through pipe 9 and valve 17 and returning through pipes 21 and 29 to interchanger C. Eventually, the cooled gas will reach interchanger C at a temperature below that of the compressed gas within tubes 3. The compressed gas will then be cooled before throttling, thus providing a regenerative effect to cool the apparatus to lower and lower temperatures until partial liquefaction of the gas results by throttling. This liquid will accumulate in the bottom of preliminary rectifier H and may be discharged through valve 17 into final rectifier L. The trays in both preliminary rectifier H and final rectifier L will fill with liquid which will also accumulate around tubes 11 and 13.

In order to cool more rapidly to liquid air temperature, the by-pass valve 44 may be opened to return the air expanded through throttle valve 6 directly to the shell of interchanger C without flowing through the trays within the rectifier. With a single-stage rectifier as shown in Figure 3, the interchanger can be cooled to liquid air temperature without appreciably cooling the trays within the rectifier. With a two-stage rectifier as shown in Figure 1 and Figure 2, the interchanger can be cooled to liquid air temperature without cooling the final rectifier, and even with very little cooling of the trays within the preliminary rectifier. Of course, after liquid air temperature is reached, liquid air is formed which accumulates on the trays and cools them to liquid air temperature.

At any time in the cooling period, the auxiliary cycle can be put into operation by starting compressor F and expansion engine E. This will augment the refrigerating effect with consequent quickening of the cooling to operating temperatures and accumulation of necessary liquids.

As these liquids accumulate, the rectifying effects of the trays as vapor and liquid flow therethrough will result in separation of the gaseous mixture into a liquid product around tubes 11 and 13 and a vapor product returning through pipes 21 and 29 to interchanger C. The liquid product may be removed through valve 25 in liquid form. The liquid product could be vaporized and removed in vapor form. In the latter case, it would probably be returned through interchanger C where it would be warmed nearly to atmospheric temperature.

During normal operation, the liquid product of the process may be removed through valve 25 at a rate which will maintain a constant liquid level around tubes 11 and 13. Throttle valve 17 is operated to maintain a constant liquid level in the bottom of preliminary rectifier H. With compressor A and compressor-expander F—E running at constant speeds and valve 42 operated to maintain constant flow therethrough, the production of liquefied product will be constant in quantity and quality for a given gaseous mixture processed. A change in quality can be produced by changing the refluxes in adjusting valve 42. This will also change the refrigerating effect by altering either the amount of flow through expansion engine E or the back pressure upon this engine. A change in quality can also be produced by changing the speed of compressor-expander F—E. The lower the refrigerating effect, the smaller will be the amount of liquid accumulating in the system. The quality can also be changed by changing the pressure of compression of the gaseous mixture by operating valve 6 because this will change the refrigerating effect. The quality of the product is thus under control and the quantity can be changed by varying the amount of gaseous mixture compressed by compressor A.

While the method and apparatus heretofore described are particularly suitable for rectifying mixed gases where one of the products of rectification is withdrawn from the process in liquid form, many of the features are also applicable where the liquid product of rectification is vaporized and warmed to room temperature before being withdrawn from the process. In either case, there is a vapor product and a liquid product of rectification. With this interpretation of vapor product and liquid product, the following claims apply to both cases because they are not limited to withdrawing the liquid product before vaporizing it.

I claim:

1. Method of separating mixed gases by rectification into a vapor product and a liquid product which includes compressing the mixed gases, cooling the compressed gases, subjecting the cooled compressed gases to a preliminary and a final rectification into said vapor and liquid products, producing liquid reflux for said preliminary rectification and liquid and vapor refluxes for said final rectification by heat interchange between vapor from the preliminary rectification and liquid from the final rectification, augmenting the liquid reflux for the preliminary rectification by warming the vapor product from the final rectification, augmenting the vapor reflux for the final rectification by cooling liquid from the preliminary rectification before subjecting this liquid to the final rectification, utilizing the vapor product to cool the compressed gases, withdrawing a portion of said vapor product, warming the portion withdrawn to about atmospheric temperature, compressing the warmed portion withdrawn, recooling the compressed portion by heat interchange with another portion before compressing it, expanding a part of the recooled compressed portion with performance of external work, utilizing the expanded part to augment the cooling effect of the vapor product, further cooling and liquefying another part thereof to augment the vapor reflux in the preliminary rectification, and utilizing the resulting liquid to augment the liquid reflux in the final rectification.

2. Method of separating mixed gases by rectification into a vapor product and a liquid product which includes compressing the mixed gases, cooling the compressed gases, subjecting the cooled compressed gases to a preliminary and a final rectification into said vapor and liquid products, producing liquid reflux for said preliminary rectification and liquid and vapor refluxes for said final rectification by heat interchange between vapor from the preliminary rectification and liquid from the final rectification, utilizing the vapor product to cool the compressed gases, withdrawing a portion of said vapor product, warming the portion withdrawn to about atmospheric temperature, compressing the warmed portion withdrawn, recooling the compressed portion by heat interchange with another portion before compressing it, expanding a part of the recooled compressed portion, with performance of external work, utilizing the expanded part to augment the cooling effect of the vapor product, further cooling and liquefying another part thereof to augment the vapor reflux in the preliminary rectification, and utilizing the resulting liquid to augment the liquid reflux in the final rectification.

3. Method of separating mixed gases by rectification into a vapor product and a liquid product which includes cooling the mixed gases, subjecting the cooled mixed gases to a preliminary and a final rectification into said vapor and liquid products, producing liquid reflux for said preliminary rectification and liquid and vapor refluxes for said final rectification by heat interchange between vapor from said preliminary rectification and liquid from said final rectification, utilizing the vapor product to cool the compressed gases, withdrawing a portion of said vapor product, compressing the withdrawn portion, expanding a part thereof with performance of external work, utilizing the expanded part to augment the cooling effect of the vapor product, and utilizing another part of the withdrawn portion to augment the vapor reflux in the preliminary rectification and the liquid reflux in the final rectification.

4. Method of separating mixed gases by rectification into a vapor product and a liquid product which includes cooling the mixed gases, subjecting the cooled mixed gases to a rectification into said vapor and liquid products, utilizing the vapor product to cool the compressed gases, withdrawing a portion of said vapor product, compressing the withdrawn portion, expanding a part thereof with performance of external work, utilizing the expanded part to augment the cooling effect of the vapor product, and utilizing another part of the withdrawn portion to produce vapor and liquid refluxes in the rectification.

5. Method of separating mixed gases by rectification into a vapor product and a liquid product which includes cooling the mixed gases, subjecting the cooled mixed gases to rectification into said vapor and liquid products, utilizing the vapor product for cooling the mixed gases, withdrawing a portion of said vapor product, compressing the withdrawn portion and expanding it with performance of external work, and then utilizing the expanded portion to augment the cooling effect of the vapor product.

6. Method of separating mixed gases into a vapor product and a liquid product as in claim 5 wherein said expanded portion is commingled with said vapor product.

7. Method of separating mixed gases into a vapor product and a liquid product as in claim 5 wherein the external work is recovered in compressing the portion withdrawn.

8. Method of separating mixed gases by rectification which includes subjecting the mixed gases to a preliminary and a final rectification, producing liquid reflux for the preliminary rectification and liquid and vapor refluxes for the final rectification by heat interchange between vapor from said preliminary rectification and liquid from said final rectification, producing vapor reflux for said preliminary rectification by vaporizing liquid from said preliminary rectification in liquefying a portion of said vapor product from the final rectification, and utilizing the liquefied portion to augment the liquid reflux in the final rectification.

9. Method of separating mixed gases by rectification into a vapor product and a liquid product which includes compressing the mixed gases, cooling the compressed gases, subjecting the cooled compressed gases to a preliminary and a final rectification into said vapor and liquid products, producing liquid reflux for said preliminary rectification and liquid and vapor refluxes for said final rectification by heat interchange between vapor from the preliminary rectification and liquid from the final rectification, augmenting the liquid reflux for the preliminary rectification by warming the vapor product from the final rectification, augmenting the vapor reflux for the final rectification by cooling liquid from the preliminary rectification before subjecting this liquid to the final rectification, utilizing the vapor product to cool the compressed gases, withdrawing a portion of said vapor product, warming the portion withdrawn to about atmospheric temperature, compressing the warmed portion withdrawn, recooling the compressed portion by heat interchange with another portion before compressing it, expanding the recooled portion with performance of external work, utilizing the expanded portion to augment the vapor reflux in the final rectification thereby liquefying the expanded portion, and utilizing the resulting liquid to augment the liquid reflux in the final rectification.

10. Method of separating mixed gases by rectification into a vapor product and a liquid product which includes cooling the mixed gases, subjecting the cooled mixed gases to a rectification into said vapor and liquid products, utilizing the vapor product to cool the compressed gases, withdrawing a portion of said vapor product, compressing the withdrawn portion, expanding the withdrawn portion with performance of external work, and utilizing the expanded portion to produce vapor and liquid refluxes in the rectification.

11. Apparatus for separating mixed gases by rectification into a vapor product and a liquid product including an interchanger for cooling the mixed gases by heat interchange with said vapor product, means for withdrawing from the interchanger a portion of said vapor product, a compressor for compressing the portion withdrawn, an expansion engine for expanding a part of the compressed portion, and means for returning the expanded portion to said interchanger where the expanded portion commingles with said vapor product of rectification and augments the cooling of the mixed gases.

12. Apparatus for separating mixed gases by rectification into a vapor product and a liquid product including an interchanger for cooling the mixed gases by heat interchange with said vapor product, a rectifier for separating the cooled mixed gases into said vapor and liquid products, means for withdrawing from the interchanger a portion of said vapor product, an auxiliary interchanger for warming the portion withdrawn and for recooling it after compression, a compressor for compressing the portion withdrawn, an expansion engine for expanding and further cooling a part of the cooled compressed portion, and means for returning the expanded portion to the first mentioned interchanger where the expanded portion commingles with the vapor product of rectification and augments the cooling of the mixed gases.

13. Apparatus for separating mixed gases by rectification into a vapor product and a liquid product as in claim 12 wherein means are provided for bringing the unexpanded part into heat exchange with liquid in the rectifier to augment the vapor reflux therein whereby the unexpanded part is further cooled and liquefied and wherein means are provided to utilize the liquefied portion to augment the liquid reflux in the rectifier before returning the unexpanded part to the first mentioned interchanger.

14. Apparatus for separating mixed gases by rectification into a vapor product and a liquid product including an interchanger for cooling the mixed gases by heat interchange with said vapor product, rectifying equipment for separating the cooled mixed gases into said vapor and liquid products, means for returning said vapor product to said interchanger, means for withdrawing from the interchanger a portion of said vapor product, an auxiliary interchanger for warming the portion withdrawn and for recooling it after compression, a compressor for compressing the portion withdrawn, an expansion engine for expanding and further cooling part of the cooled compressed portion, means for returning this expanded part to the first mentioned interchanger, means for bringing another part of the cooled compressed portion into heat exchange with liquid in the rectifier to augment vapor reflux therein whereby this part is further cooled and liquefied, and means for utilizing the liquefied part to augment the liquid reflux in the rectifying equipment.

15. Apparatus for separating mixed gases by rectification into a vapor product and a liquid product including a compressor for compressing the mixed gases, an interchanger for cooling the compressed mixed gases by heat interchange with said vapor product, a rectifier containing trays for separating the cooled mixed gases into said vapor and liquid products, a throttle valve for throttling the cooled compressed mixed gases into said rectifier and a by-pass valve for returning the throttled mixed gases from said rectifier to said interchanger whereby said interchanger is cooled without appreciably cooling said trays in said rectifier.

16. Apparatus for separating mixed gases by rectification into a vapor product and a liquid product including a compressor for compressing the mixed gases, an interchanger for cooling the compressed mixed gases by heat interchange with said vapor product, a preliminary and a final rectifier for separating the cooled mixed gases into said vapor and liquid products, a throttle valve for throttling the cooled compressed mixed gases into said preliminary rectifier and a by-pass valve for returning the throttled mixed gases from said preliminary rectifier to said interchanger whereby said interchanger is cooled without appreciably cooling said final rectifier.

17. Apparatus for separating mixed gases by rectification into a vapor product and a liquid product which includes an interchanger for cooling the mixed gases by heat interchange with said vapor product, a rectifier for separating the cooled mixed gases into said vapor and liquid products, means for supplying said interchanger with said vapor, means for withdrawing from the interchanger a portion of said vapor product, an auxiliary interchanger for warming the portion withdrawn and for recooling it after compression, a compressor for compressing the portion withdrawn, an expansion engine for expanding and further cooling the cooled compressed portion, means for returning the expanded portion to said rectifier where it is commingled with said vapor product, a throttle valve for throttling the cooled compressed mixed gases into said rectifier, and a by-pass valve for returning the throttled mixed gases from said rectifier to said interchanger whereby said interchanger is cooled without appreciably cooling said rectifier.

WILLIAM LANE DE BAUFRE.